United States Patent
Chen et al.

(10) Patent No.: US 10,984,190 B2
(45) Date of Patent: Apr. 20, 2021

(54) ATOM-BASED SENSIBLE SYNCHRONIZATION FOR INFORMATION INDEXING

(71) Applicant: INTERNATIONAL BUSINESS MACHINES CORPORATION, Armonk, NY (US)

(72) Inventors: Ye Qing Chen, Shanghai (CN); Zhen Hong Ding, Shanghai (CN); Chang Lei, Shanghai (CN); Wen Juan Nie, Zhejiang (CN); Yi-Hsiu Wei, Austin, TX (US); Ting Wu, Shanghai (CN); Zhao Yang, Shanghai (CN); Chao Zheng, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/527,499

(22) Filed: Jul. 31, 2019

(65) Prior Publication Data
US 2019/0354577 A1    Nov. 21, 2019

Related U.S. Application Data

(62) Division of application No. 15/295,434, filed on Oct. 17, 2016, now Pat. No. 10,534,856.

(51) Int. Cl.
*G06F 40/197*     (2020.01)
*G06F 16/84*      (2019.01)
(Continued)

(52) U.S. Cl.
CPC .......... *G06F 40/197* (2020.01); *G06F 16/84* (2019.01); *G06F 16/93* (2019.01); *G06F 40/166* (2020.01); *G06Q 10/101* (2013.01)

(58) Field of Classification Search
None
See application file for complete search history.

(56) References Cited

U.S. PATENT DOCUMENTS 6,631,386 B1    10/2003    Arun et al.
8,001,462 B1*   8/2011     Kupke ............... G06F 16/951
                                                    715/229
(Continued)

OTHER PUBLICATIONS

List of IBM Patents or Patent Applications Treated as Related dated Jul. 31, 2019, 2 pages.
(Continued)

*Primary Examiner* — Howard Cortes
(74) *Attorney, Agent, or Firm* — Tutunjian & Bitetto, P.C.; Scott Dobson

(57) ABSTRACT

A system from updating a document to include revisions made by multiple parties that includes an indexing module for building relationships between atom repositories and source files, and a mapping module builds a relationship between multiple atom repositories produced by indexing module that are associated with a same source file family. The system also includes an atom controlling module for controlling atom adding and atom splitting in the multiple atom repository in response to update, insert and delete operations of information units in the source file. The system can also include a synchronizing engine for synchronizing updates from one version of the source file to all versions of the source file in accordance with the atom controlling module that have been made by all users when be viewed by a single user.

9 Claims, 10 Drawing Sheets

(51) Int. Cl.
 *G06F 16/93* (2019.01)
 *G06Q 10/10* (2012.01)
 *G06F 40/166* (2020.01)

(56) References Cited

U.S. PATENT DOCUMENTS

| | | | |
|---|---|---|---|
| 8,090,681 B2 | 1/2012 | Lukiyanov et al. | |
| 8,504,523 B2 | 8/2013 | Starkey | |
| 8,601,440 B2 | 11/2013 | Massey et al. | |
| 8,627,489 B2 | 1/2014 | Herbach et al. | |
| 8,739,021 B2 | 5/2014 | Yuniardi | |
| 8,910,117 B2 | 12/2014 | Li et al. | |
| 9,152,412 B2* | 10/2015 | Cowan | G06F 8/71 |
| 9,292,507 B2 | 3/2016 | Calkowski et al. | |
| 9,710,502 B2 | 7/2017 | Edelstein et al. | |
| 9,785,693 B2* | 10/2017 | Kapadia | G06F 16/93 |
| 2003/0145020 A1* | 7/2003 | Ngo | G06F 16/178 |
| 2009/0043824 A1* | 2/2009 | Claghorn | G06F 16/93 |
| 2009/0313331 A1* | 12/2009 | Rasmussen | G06F 40/197 709/205 |
| 2010/0077380 A1* | 3/2010 | Baker | G06F 8/71 717/120 |
| 2011/0209070 A1 | 8/2011 | Lowry et al. | |
| 2012/0101980 A1* | 4/2012 | Taleghani | G06F 16/1774 707/608 |
| 2012/0179647 A1 | 7/2012 | Crucs | |
| 2012/0192049 A1* | 7/2012 | Clee | G06F 40/134 715/208 |
| 2012/0290926 A1* | 11/2012 | Kapadia | G06F 40/166 715/255 |
| 2014/0281872 A1* | 9/2014 | Glover | G06F 40/194 715/229 |
| 2015/0227514 A1* | 8/2015 | Gillett | G06F 16/182 707/608 |
| 2016/0055143 A1* | 2/2016 | Goel | H04L 63/08 715/229 |

OTHER PUBLICATIONS

"Version Control Best Practices for Enterprise Architect" Sparks Systems (2010) pp. 1-17.

"Guidance Document: Version Control" (May 2015) pp. 1-3, Version 1.0.

\* cited by examiner

| Category | Update Actions |
|---|---|
| Accessibility | Add alt text for images |
| | Identify headers for the table rows and columns |
| | Use header elements for topics |
| | Provide a text alternative for ASCII art |
| Acrolinx | Fix grammar issues |
| | Correct wording typos |
| | Break long sentences |
| | Change to active tense |
| | Fix broken links |
| Terminology | Update keywords in conref files |
| | Update product glossary |
| Word Usage | Changes related to word usage database |

FIG. 2

ATOM-BASED SENSIBLE SYNCHRONIZATION FOR INFORMATION INDEXING

BACKGROUND

Technical Field

The present invention relates to the information development, and more specifically to tracking changes made to a document by numerous parties.

Description of the Related Art

Collaboration is a widely-used technique for providing increased productivity and effectiveness in corporate environments. However, problems exist at least with knowing the version of the content (in the document) on which work is being performed is an important aspect of collaboration. For example, consider that a single document is the focus of collaboration sharing among a group of users. In this typical case, each user can make updates to the document and the updates will then be merged into the single document. However, the timing of the updates can pose problems as well as who made the updates to a given piece of content. Generally, the chronology of the updates needs to be tracked so that the final version contains all the updates and when made in the proper order. Moreover, this becomes particularly problematic when using email for sending the document updates.

SUMMARY

According to present principles, described herein is a system for atom based sensible synchronization for information indexing. In one embodiment, the system for updating a document to include revisions made by multiple parties may include an indexing module for building relationships between atom repositories and source files, the atom repositories including information units; and a mapping module to build relationships between multiple atom repositories produced by indexing module that are associated with a same source file family. The system may further include an atom controlling module for controlling atom adding and atom splitting in the multiple atom repository in response to update, insert and delete operations of information units in the source file. The system may further include a synchronizing engine for synchronizing updates from one version of the source file to all versions of the source file in accordance with the atom controlling module that have been made by all users when be viewed by a single user.

In another embodiment, a method of updating a document to include revisions from multiple parties is provided. The method may include analyzing a version of a document for determining whether information units have been added to the document relative to a family of the document, wherein said information units are configured in an atom collection. The method further includes comparing the atom collection from the version of the document with atom collections of the family of the document to determine corresponding information units. A number of atoms can be determined based upon whether the information units have been added to the document. Each atom in the number of atoms is mapped to each version of the document in the family of the document and the version of the document analyzed for whether information units have been added. Each version of the document in the family of documents is updated that has been mapped to each atom including the information units that have been added to the version of the document.

In another embodiment, a computer program product is provided for updating a document to include revisions from multiple parties. The computer program product comprising a computer readable storage medium having program instructions embodied therewith, the program instructions being executable by a computer to cause the computer to perform a method that includes analyzing a version of a document for determining whether information units has been added to the document relative to a family of the document, wherein said information units are configured in an atom collection; and comparing the atom collection from the version of the document with atom collections of the family of the document to determine corresponding information units. The instructions may further include determining a number of atoms based upon whether said information units have been added to the document; and mapping each atom in the number of atoms to each version of the document in the family of the document and the version of the document analyzed for whether information units have been added. The computer program product can also include updating each version of the document in the family of documents that have been mapped to each atom including the information units that have been added to the version of the document. The computer readable storage medium may be non-transitory.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 2 is a table of one example of information development (ID) rules for use with the atom-based sensible synchronization for information, in accordance with one embodiment of the present disclosure.

DETAILED DESCRIPTION

The methods, systems and computer program products relate to atom based sensible synchronization system for organizing information. It has been determined that when information development (ID) professionals make updates to a specific version of a document, e.g., text based document, and those updates apply to other associates versions of the document, they typically need to manually copy the source updates, open each associated version of the document and insert, e.g., paste, the updates into these versions. Time is spent on copying, reviewing, saving and checking the different versions, e.g., via computer operations, not to mention the extra efforts on revisions to the documents for update and the future maintenance of the updates. Typically, in the information development (ID) area, it can be advantageous to maintain multiple different versions of the same product at the same time. Information can be updated per unit. So each information unit can be considered as an "atom" in an atom based sensible method for synchronization of information, e.g., synchronization of information changes.

In some embodiments, of atom-based information indexing, information units taken from a document that is being modified by people making changes to the documents are divided and combined as "atoms". Information units, such as words, sentences, and/or paragraphs can be represented as "atoms". The document maps to an atom collection, and the mapping information is stored in the documents metadata. For example, the update, insert and delete operations applied to a version of the document are applied to the atoms, which results in the atoms increase or split. The atom based information indexing methodology disclosed herein includes base and rebase functions. For example, different versions of a document can share a same base atom collection. In other examples, in which an entirely new version of a document, i.e., an entirely new version of information is to be released, the document may be rebased. In this example, the atom collection associated with this version of the document can be reset to contain one big atom. The methods, systems and computer program products for providing atom based sensible synchronization for information are now described in greater detail with reference to FIGS. 1-10.

Figure 1:
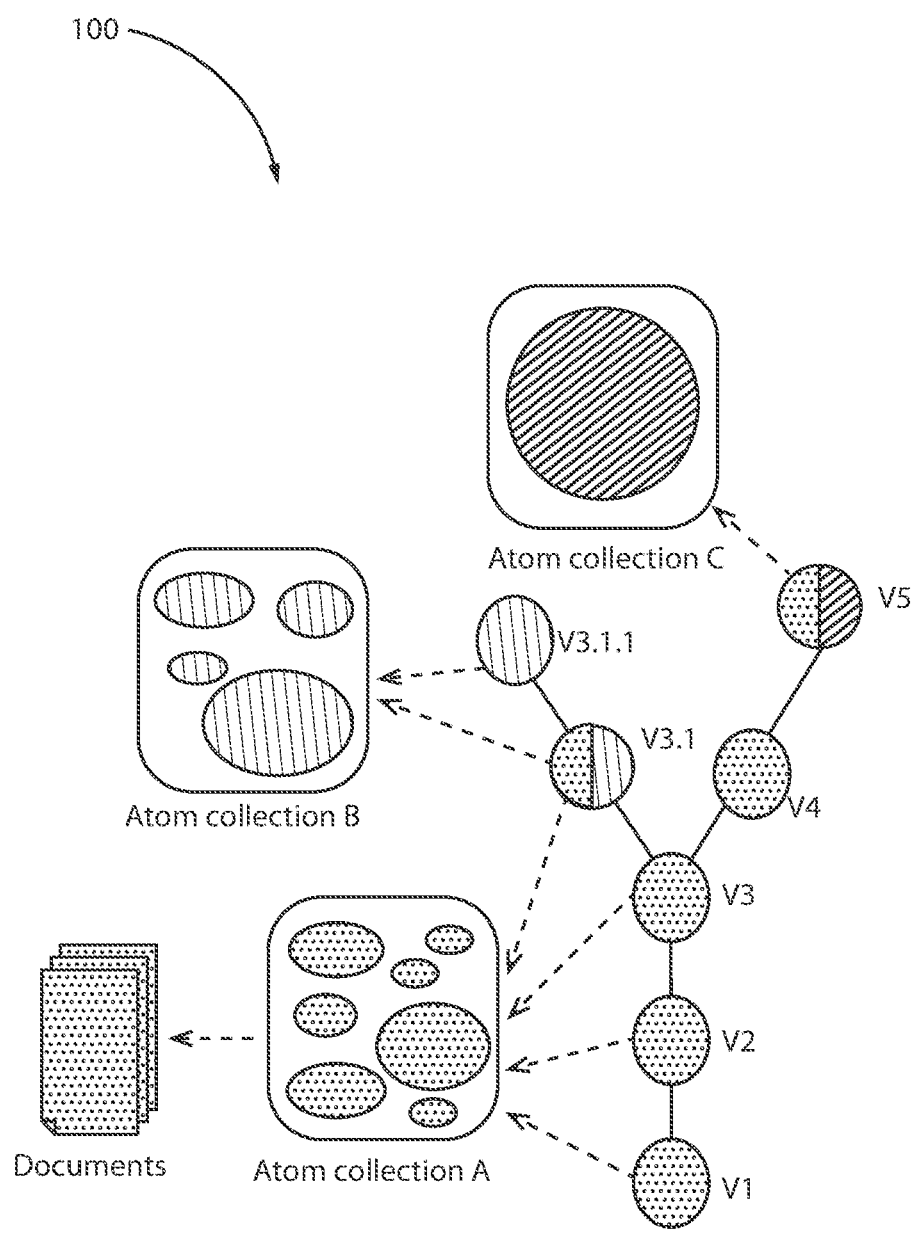
FIG. 1 is a schematic illustrating one embodiment a tree of changes that have been made to a document, atom collections that correspond to the document versions, and a document mapping to an atom collection, in accordance with one embodiment of the present disclosure.

It is observed that existing control methods, such as real time control (RTC) methods, compare versions of a document, find differences and manually merge and overwrite the change from one version to another. The atom based sensible synchronization version control systems provide that all atoms of each version are indexed in the collection, and that no version is overwritten when a version is changed. FIG. 1 illustrates one embodiment of a schematic illustrating a tree of changes 100 that have been made to a document, i.e., document versions V1, V2, V3, V3.1, V3.1.1, V4, V5; atom collections, i.e., Atom collection A, Atom collection B, and Atom collection C, that correspond to the document version; and a document 5 mapping to an atom collection. In accordance with some embodiments, a change can be applied to any version in the tree, no matter whether the destination version is one of the parents, e.g., V1, of the current version. In some embodiments, the atom based sensible synchronization version control system can automatically apply changes that match the information development (ID) rules. One example, of information development (ID) rules is included in FIG. 2. The update actions listed in the information development (ID) rules included in FIG. 2 are automatically applied to the versions of the document. Only the changes that are restricted to certain versions need to be synchronized manually.

Referring to FIG. 1, in some embodiments, the information units contained within a document, such as words, sentences, or paragraphs, can be represented by the atoms, e.g., Atom collection A, Atom collection B, and Atom collection C. A document 5 may be mapped to an atom collection. The indexing information is stored in the document metadata. Each version V1, V2, V3, V3.1, V3.1.1, V4, V5 is associated with an index of the atom collections. Each new version is inherited from its parent, e.g., version V1 may be a parent, while versions V2, V3, V4, etc., may be a newer version.

In some embodiments, a new base may be selected by the atom based sensible synchronization version control system. For example, the version 3.1 may be selected for the base, in which Atom collection B is created in which Atom Collection B is associated with the multiple atom collections, i.e., Atom Collection A, including the atom collections from the preceding versions, e.g., versions V1, V2, V3, V4. The atom collection for the new base provided by version V3.1, e.g., Atom Collection B, may then be used for atom based sensible synchronization for the later versions of the document, e.g., version V3.1.1.

Figure 3:
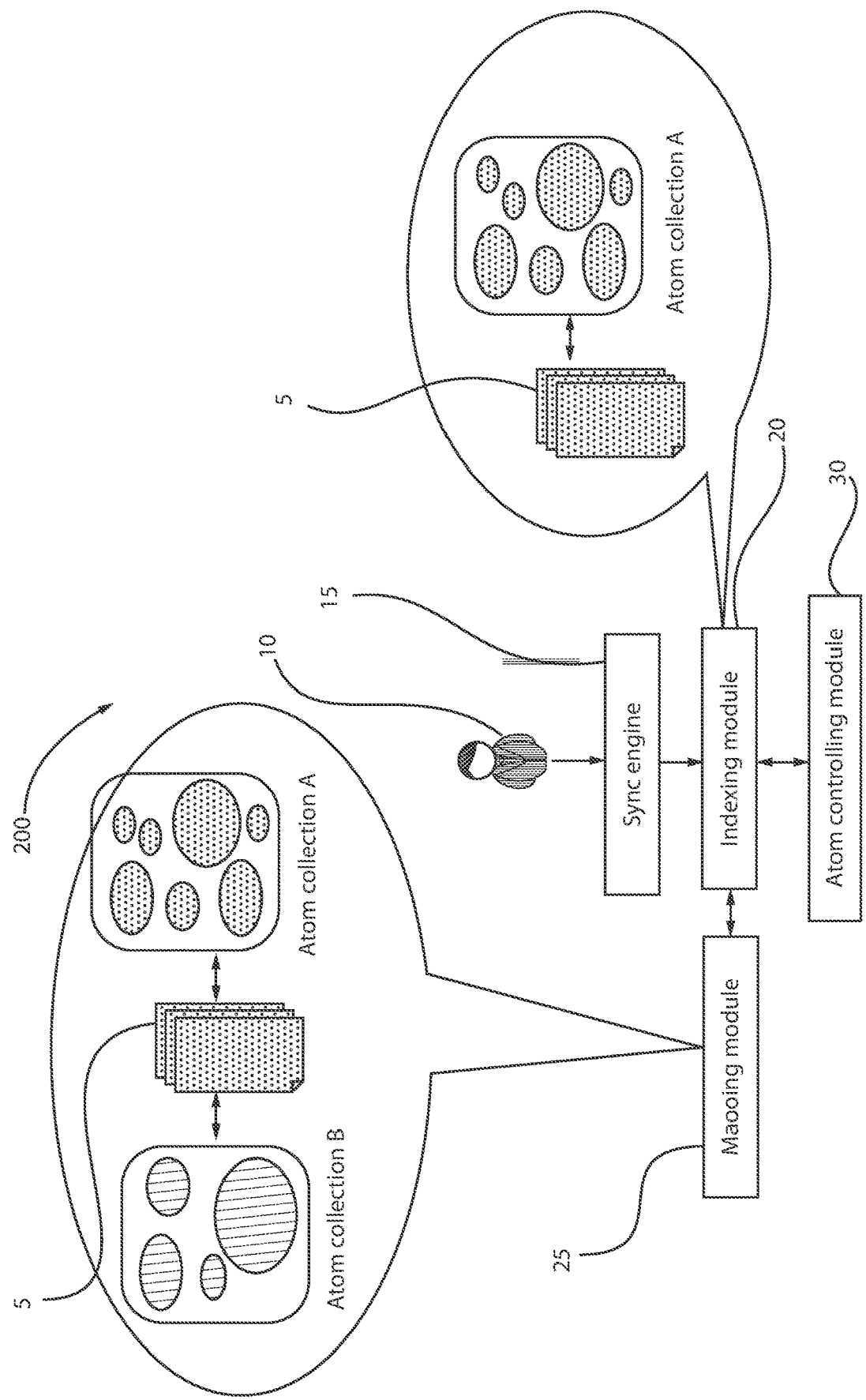
FIG. 3 is a block diagram illustrating the interaction of a mapping module, indexing module and atom controlling module in an atom-based sensible synchronization indexing system, in accordance with one embodiment of the present disclosure.

FIG. 3 is a block diagram illustrating the interaction of a mapping module 25, indexing module 20 and atom controlling module 30 in accordance with one embodiment of an atom-based sensible synchronization system 200. As depicted in FIG. 3 a user 10 that is viewing or modifying a version of a document 5 interacts with the atom-based sensible synchronization system 200 through a synchronization engine 15. The function of the synchronization engine 15 is to synchronize the updates to the document being viewed and/or modified by the user 10 in accordance with the functions of the atom controlling module 30, the indexing module 20 and the mapping module 25. In some embodiments, the synchronization engine 15 includes an interface for the user 5 to enter revisions to a document, i.e., produce new versions of a document, into the atom-based sensible synchronization indexing system 200. In some embodiments, the synchronization engine 15 may further provide a mechanism to display the various changes in the updated version of the document being synchronized with the other versions of the document that may have been produced by the user 15 at an earlier time, or may have been produced by other users.

In some embodiments, the synchronization engine 15 automatically applied changes to the different versions of the document when the changes match at least one of a set of Information Development (ID) rules. One example of a set of ID rules is provided in FIG. 2.

Figure 4:
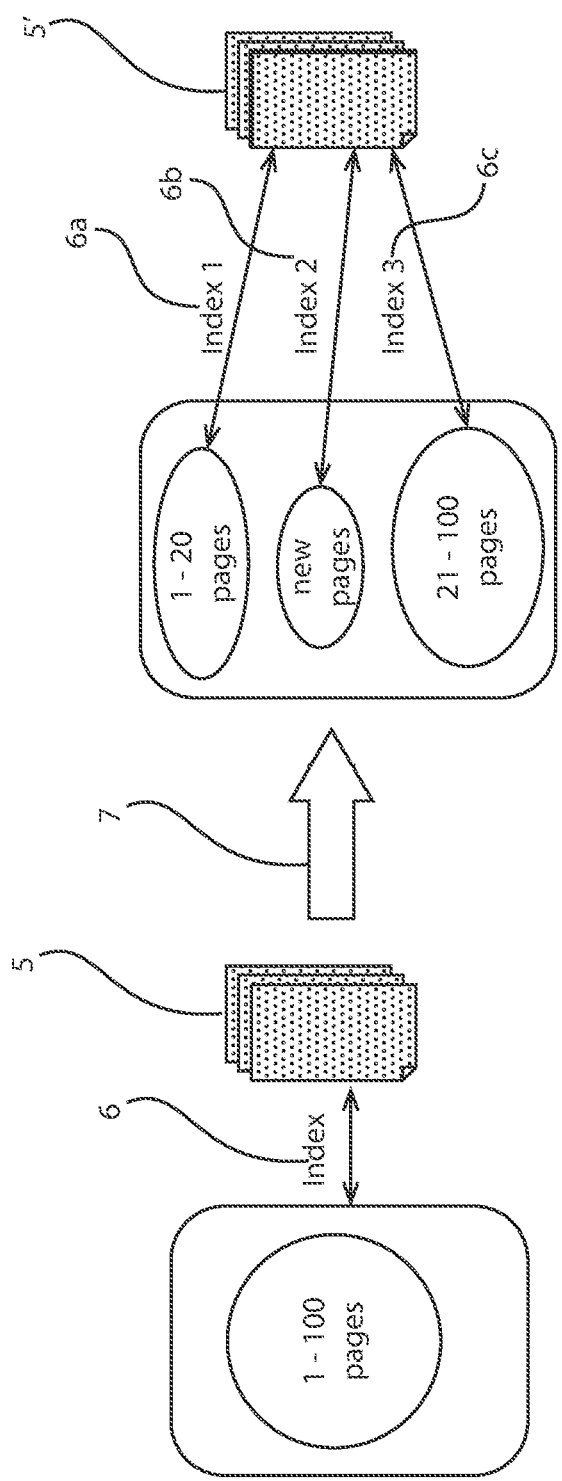
FIG. 4 is a block diagram/flow chart illustrating the function of an index module for building relationships in accordance with one embodiment of an atom-based sensible synchronization indexing system.

The atom-based sensible synchronization indexing system 200 may further include an indexing module 20. In some embodiments, the indexing module 20 can build the indexing relationships between an atom repository and source files associated with this repository, as depicted in FIG. 4. For example, the indexing module procedure may begin with a 100 page source document 5, from which a first index 6 is produced, in which the index includes atoms. As noted above, the atoms include information units, such as words, sentences and/or paragraphs that are represented by atoms. In some embodiments, when a user 10 updates the document 5, i.e., produces a new version of the document 5', e.g., by adding a new page 7 to the document 5, the indexing module 20 may analyze the updated version of the document 5', and creating a new series of indexes 6a, 6b, 6c corresponding to the updated version of the document 5'. The new series of indexes 6a, 6b, 6c provide a collection of atoms. All the atoms of each update, i.e., version of the comment, are indexed in the collections. No version is overwritten. In the example depicted in FIG. 4, the indexing module 20 may create three indexes 6a, 6b, 6c each including a collection of atoms. For example, the first index 6a correlates to the content of the first portion of the original document before the new content has been added, e.g., the first 20 pages of the original 100 page document prior to the newly added page. The second index 6B correlates to the content of the of the new page 7 that was added in the updated document 5', i.e., new version of the document. The third index 6C correlates to the content of the final portion of the original document after the new content has been added, e.g., the last 21-100 pages of the original 100 page document after the newly added page.

Figure 5:
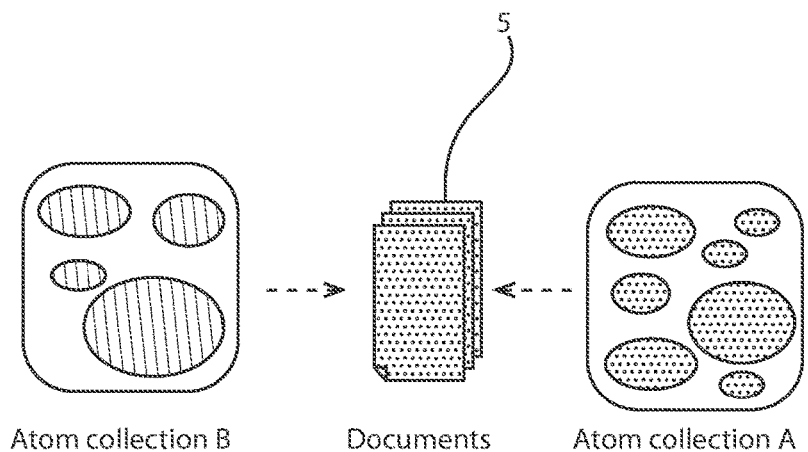
FIG. 5 is a schematic illustrating one embodiment of a mapping module for building mapping relationships between multiple atom repositories associated with a document in accordance with one embodiment of an atom-based sensible synchronization indexing system.

Referring to FIGS. 3 and 5, in some embodiments, the mapping module 25 builds a mapping relationship between multiple atom repositories, e.g., Atom collection A and Atom collection B, associated with the same file, i.e., a same version of a document 5. The mapping info is stored in the document metadata. Referring to FIGS. 1 and 3, in one example, the mapping module maps Atom collection A with versions V1, V2, V3 and V3.1 of the document 5; the mapping module maps Atom collection B with versions V3.1 and V3.1.1 of the document 5; and the mapping module maps Atom collection C with version V5 of the document.

Figure 6:
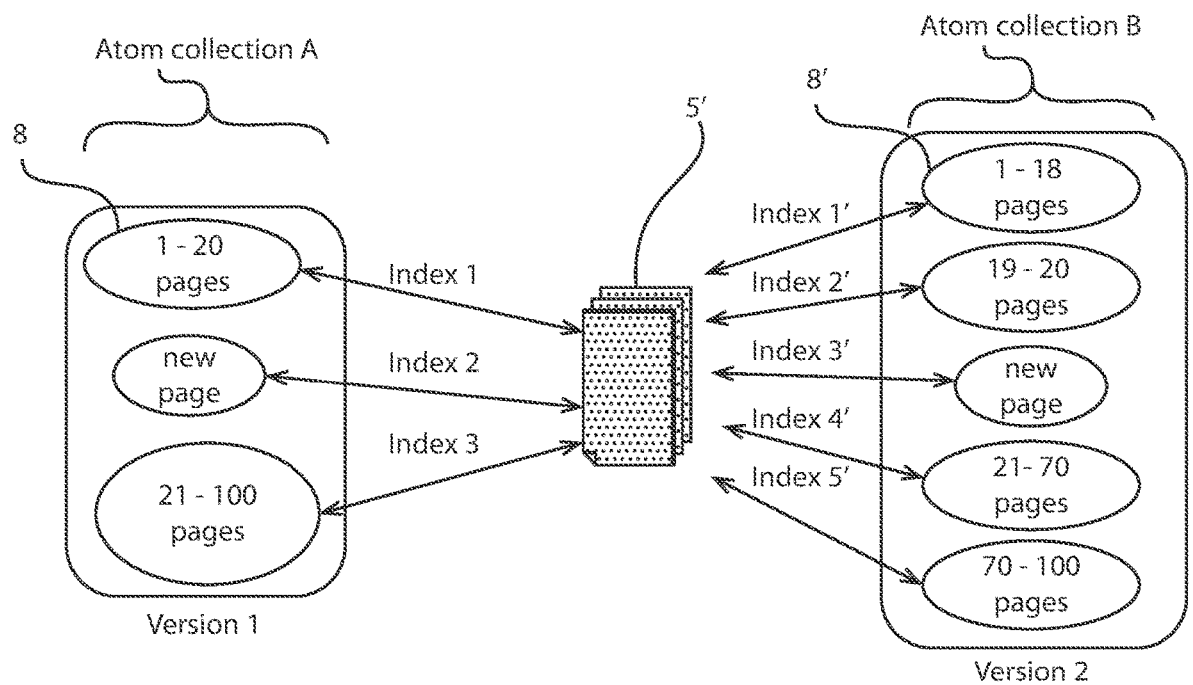
FIG. 6 is a schematic view illustrating one embodiment of an atom controlling module managing the behavior of atoms, such as atom adding and atom splitting, in accordance with one embodiment of the present disclosure.

Referring to FIGS. 3 and 6, the atom controlling module 30 manages the behavior of atoms, such as atom adding and atom splitting. In some embodiments of atom-based indexing, the information units, such as words, sentences, paragraphs and/or pages, are represented as atoms, so that a document 5 is mapped to a collection of atoms, e.g., Atom collection A, Atom collection B and/or Atom collection C. Each collection of atoms has an index. The update, insert and delete operations of information units are applied to the atoms, which results in the atom's increase or split. FIG. 6 depicts one embodiment, of two versions of a document being analyzed, in which a newly added page of the document results in a split in the number of atoms. As depicted in FIG. 6, the split in atoms increases from 3 to atoms 8 of information to 5 atoms 8' of information. The first version of the document had a collection of 3 atoms 8 each having an index, i.e., index 1, index 2, index 3, wherein the second version of the document had a collection of 5 atoms 8' each having an index, i.e., index 1', index 2', index 3', index 4', index 5'.

Figure 7:
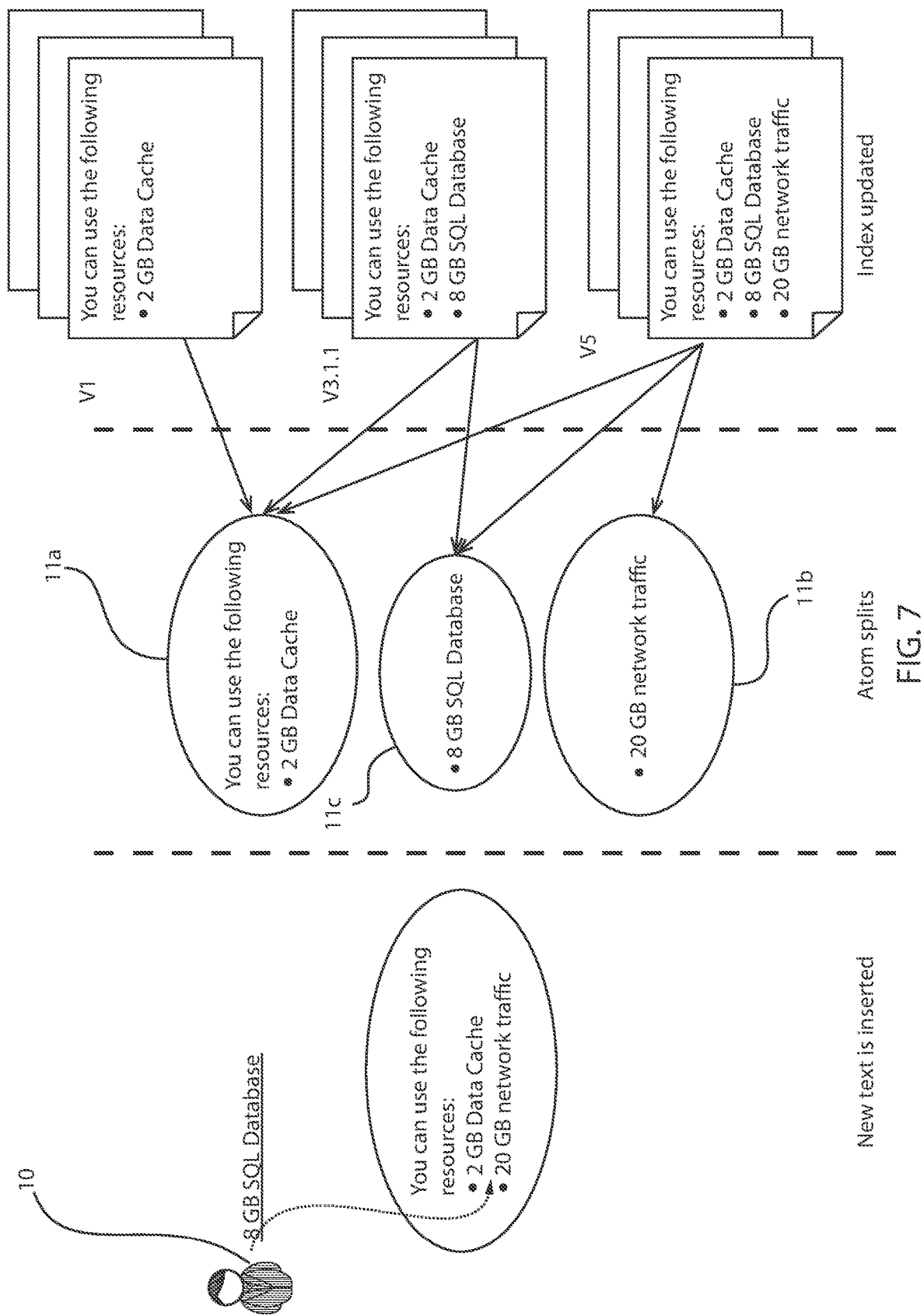
FIG. 7 illustrates one example of how the atom-based sensible synchronization indexing system processes a new version of a document.

FIG. 7 illustrates one example of how the atom-based sensible synchronization indexing system 200 processes a new version of a document. In one embodiment, the atom based synchronization system provides synchronization from a new version V5 to an old version V3.1.1. For example, a new sentence is added to the new version V5 of the document. In this example, a new portion of text "8 GB SQL Database" is added to a prior version of a document by a user 10, e.g., the new sentence is added to version V5 of the document. The text is added by the user at the interface with the sync engine 15, as depicted in FIG. 3.

The old version V3.1.1 of the document and the new version V5 of the document are indexed from the same atom collection. The indexing module 20 builds an indexing relationship between the newly added information, i.e., text "8 GB SQL Database", and an atom collection, e.g., atoms 11a and 11c. More specifically, in some embodiments, the indexing module 20 searches the atom collection of the newest version V5 of the document for the corresponding atoms of this updated sentence, e.g., the text "8 GB SQL Database".

The atom controlling module 30 makes updates to the atoms. As illustrated in FIG. 7, the new portion of the text is to be inserted between two existing lines of text, i.e., "2 GB Data Cache" and "20 GB network traffic". In some embodiments, the atom controlling module 30 creates atoms 11a, 11b, 11c, in which atom 11c includes the new lines of text. All atoms of each version, e.g., V1, V3.1.1, and V5, are indexed in the collections, in which no version is overwritten when a version is changed.

The atom splits are then mapped to each version of the document, e.g., version V1, version V3.1.1, and version V5 from the atoms splits 11a, 11b, 11c. Mapping is provided by the mapping module 25, as depicted in FIG. 3. For example, atom 11a is mapped to versions V1 and version V3.1.1; and atom 11b is mapped to version V5; and atom 11c is mapped to versions V5 and V3.1.1.

Because the new version V5 and the old version V3.1.1 share the same atom collection, the old version V3.1.1 is also updated, i.e., updated with the new version V5. For example, the indexing module updates the indexes of the old version V3.1.1, then the files of the old version V3.1.1 with the new sentence, i.e., new information unit.

The versions V1, V3.1.1. and V5 may each updated by the synchronization engine 15. Through the synchronization engine 15, a change can be applied to any version of the tree of versions of the document, no matter when the destination version is one of the parents, e.g., V1, V3.1.1, of the current version V5. The synchronization engine 15 may automatically apply changes to different versions of the document when the types of changes match a number of information development (ID) rules, such as the rules included in FIG. 2. In some embodiments, only the changes that are restricted to certain versions of the document need to by synchronized manually.

Figure 8:
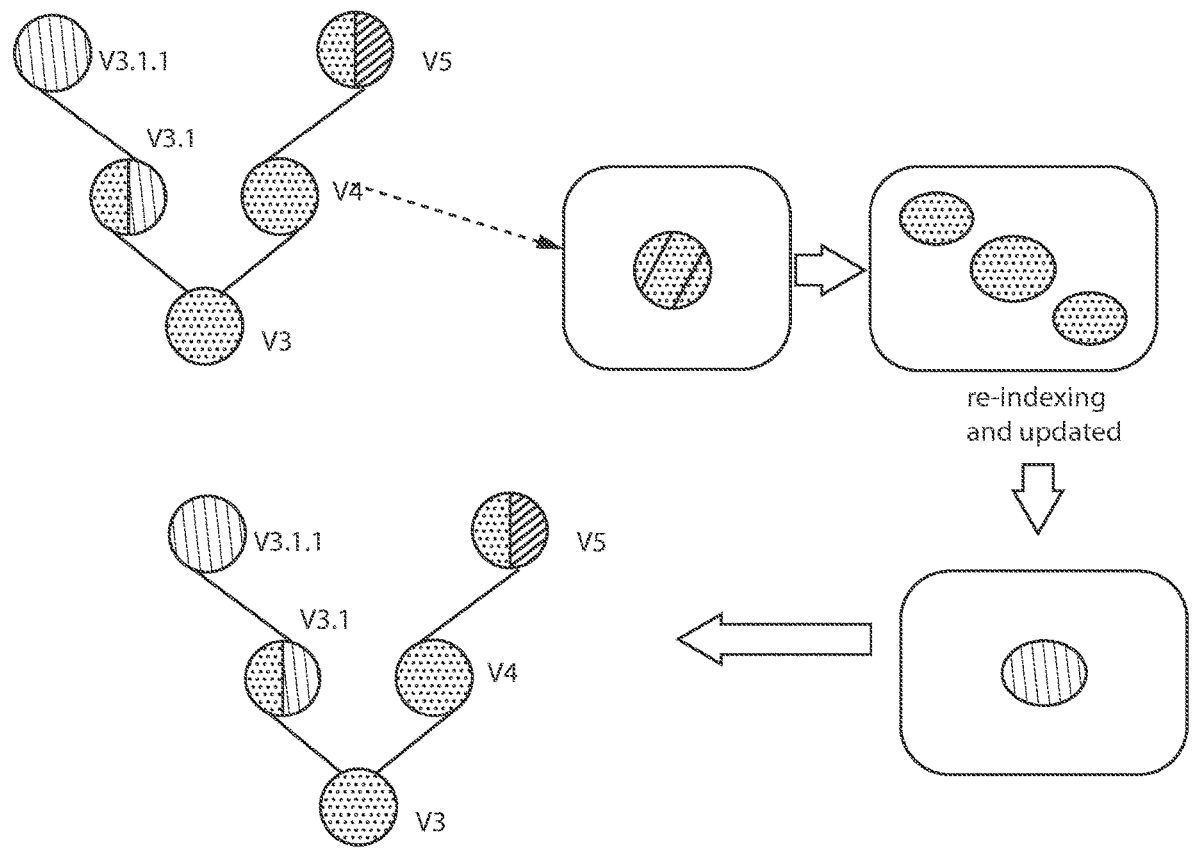
FIG. 8 is a schematic illustrating one example of how the atom-based sensible synchronization indexing system processes an old version of a document to integrate changes.

FIG. 8 illustrates one example of how the atom-based sensible synchronization indexing system processes an old version of a document to integrate changes. In one example, the atom based synchronization system provides synchronization from a new version V5 to an old version V3.1.1. In one scenario, the user 10 would like to apply the change previously made to version V2 of the document. The V2 and V4 versions of the document are indexed from the same atom collection. A new sentence is added to a V4 document file. The user want to apply the change to V2. V2 and V4 are indexed from the same atom collection.

A new sentence is added to a V4 document file. The user want to apply the change to V3.1.1. V3.1 is the base between V4 and V3.1.1. The indexing module searches the V4's atom collection for the corresponding atoms of this updated sentence. The atom controlling module makes the updates to the atoms that are found in step 1. Because V4 and V3.1 share the same atom collection, the V3.1 atoms are also updated. The mapping module synchronize the two atom collections that the base version 3.1 is associated to. Then the atom collection that V3.1 and V3.1.1 are indexed to is updated with the new sentence. The indexing module updates the indexes of V4, then the files of V4 are updated with the new sentence.

In some embodiments, the methods and structures described herein advantageously provides that the users viewing and modifying documents can be spared the trouble of manually committing the same changes to multiple versions of the documentation. By clicking on the updates that that the user enters in any version and selecting the applicable versions in the source control system, automatic synchronization of updates across the selected versions will take place. Using the atom based synchronization systems users can make updates and synchronize several updates to documents that apply to different subsets of versions all within one document. Further, instead of maintaining multiple versions of the documentation, you can concentrate on working with one version in which any updates will be automatically committed to all associated applicable versions.

Figure 9:
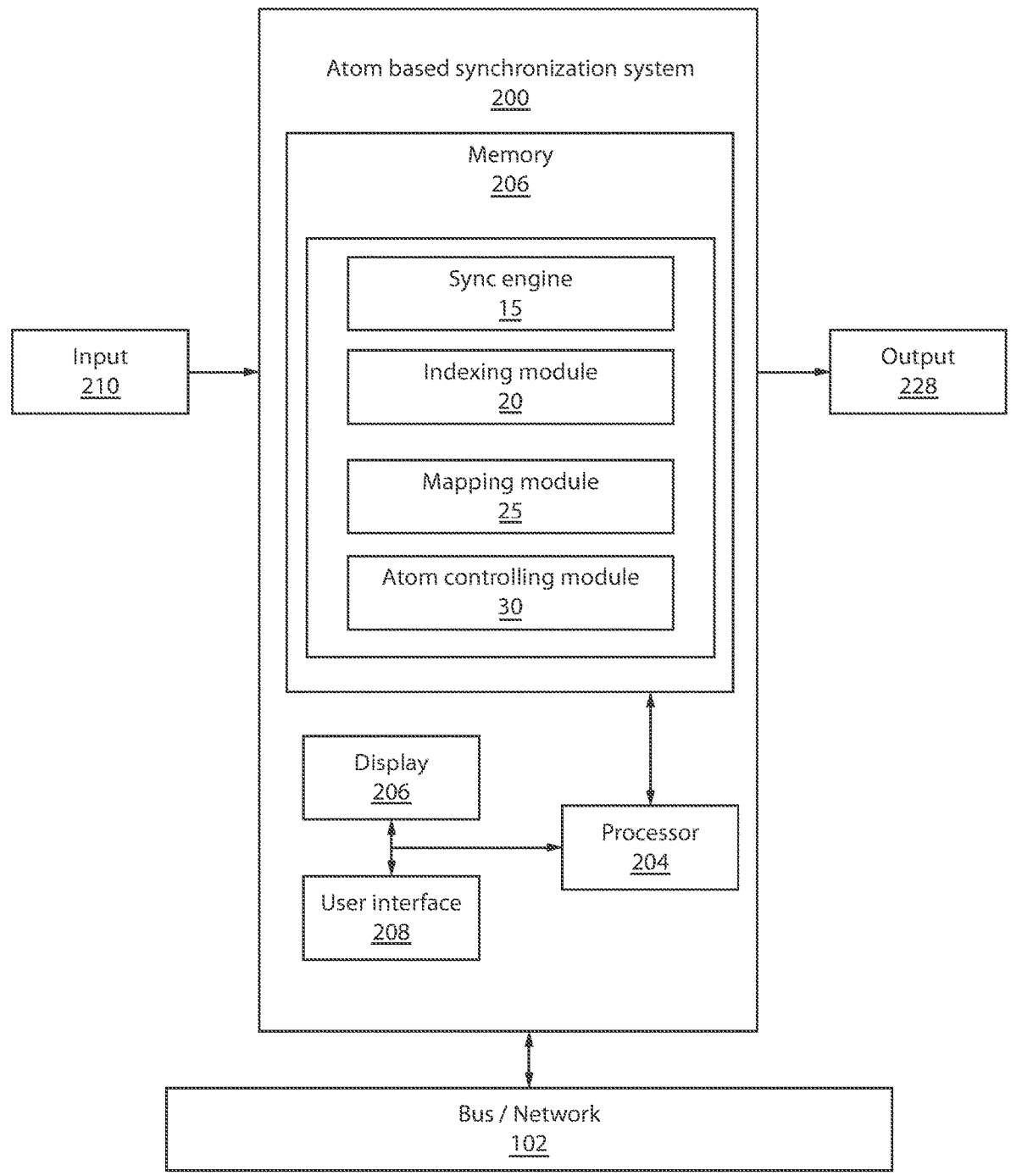
FIG. 9 is a block diagram illustrating one embodiment of an atom-based sensible synchronization indexing system

FIG. 9 depicts a system is provided for atom based sensible synchronization for information indexing, in which the present principles can be applied.

The system 200 includes one or more processors 204 and memory 206 for storing applications, modules and other data. In one embodiment, the memory unit 206 includes a large number of memory blocks.

The atom based sensible synchronization device 202 may include a synchronization engine 15, indexing module 20, mapping module 25 and atom controlling module 30. Further details regarding the synchronization engine 15, indexing module 20, mapping module 25 and atom controlling module 30 and their function is provided above in the description with reference to FIGS. 1-8. The system 200 may also include one or more displays 206 for viewing content. The display 206 may permit a user to interact with the system and its components and functions. This may be facilitated by the inclusion of a user interface 208, which may include a mouse, joystick, or any other peripheral or control to permit user interaction with the system and/or its devices. It should be understood that the components and functions of the system may be represented as one or more discrete systems or workstations, or may be integrated as part of a larger system or workstation. The atom based sensible synchronization device 202 200 is depicted as a computer-implemented approach to indexing changes and updating changes in electronic documents resulting in faster processing time, lower system latency and more efficient use of memory space.

The system 200 receives input 210, which may include data and data objects in a memory array found in a local place that are to be copied and transferred to a remote place. The input 210 to the system 200 may be changes to a version of a document to be indexed by the atom based sensible synchronization device 202, which can update the family of documents, i.e., all the different versions of the documents.

Data is transmitted by the system 200 as output 228 to a user, in which the system may display the changes made to the most recent version of the document, as well as display the changes in all versions of the document, to be reviewed by the user.

The above embodiment of system 200 is merely exemplary. Variations of this embodiment and other embodiments altogether that implement the present principles are within the scope of the present disclosure. Likewise, the functions of one or more of the aforedescribed units and modules can be combined into one or more of the other units and modules.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
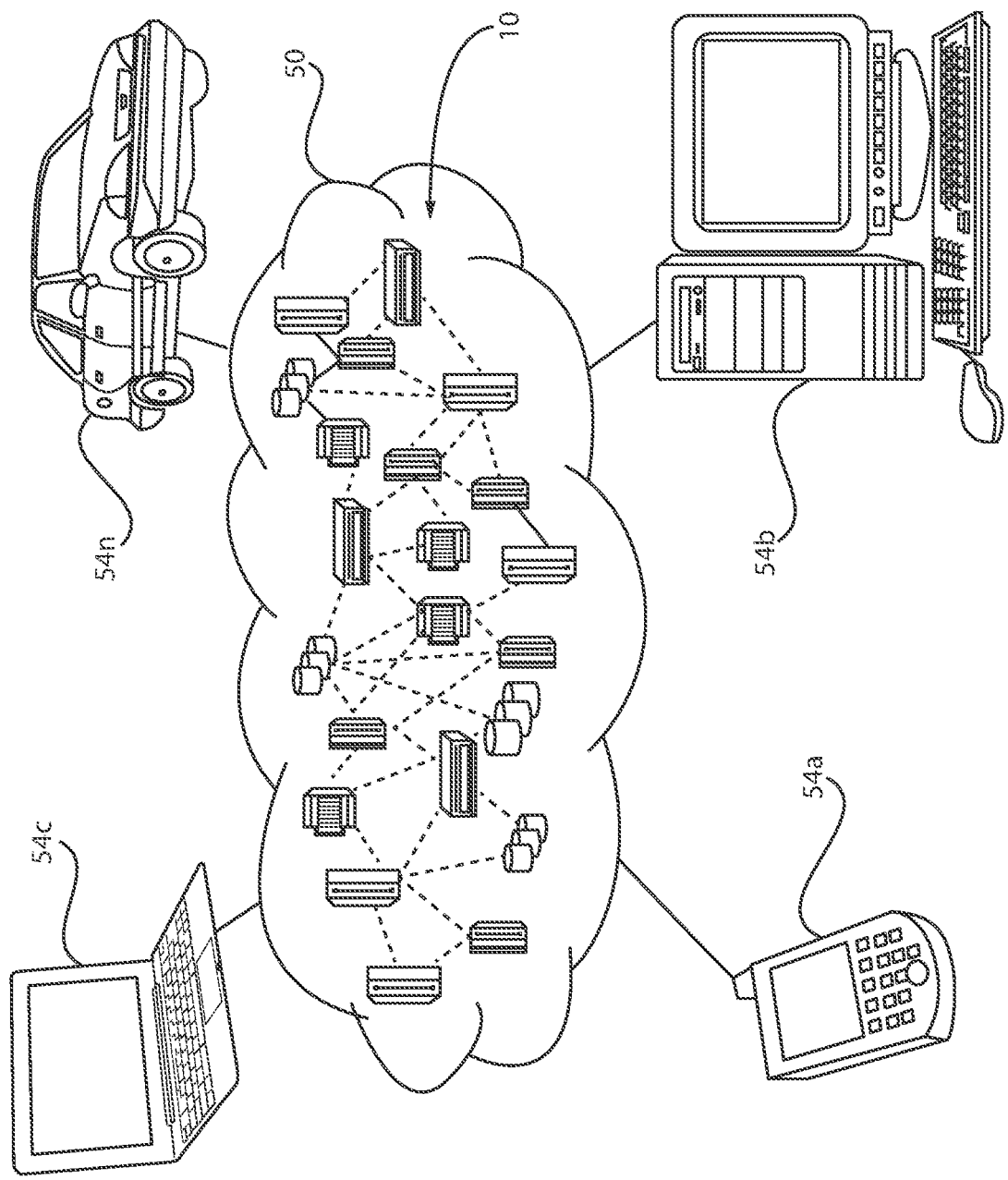
FIG. 10 depicts a cloud computing environment according to an embodiment of the present disclosure.

Referring now to FIG. 10, illustrative cloud computing environment 50 is depicted. As shown, cloud computing environment 50 includes one or more cloud computing nodes 110 with which local computing devices used by cloud consumers, such as, for example, personal digital assistant (PDA) or cellular telephone 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 110 and cloud computing environment 150 can communicate with any type of computerized device over any type of network and/or network addressable connection (e.g., using a web browser).

Figure 11:
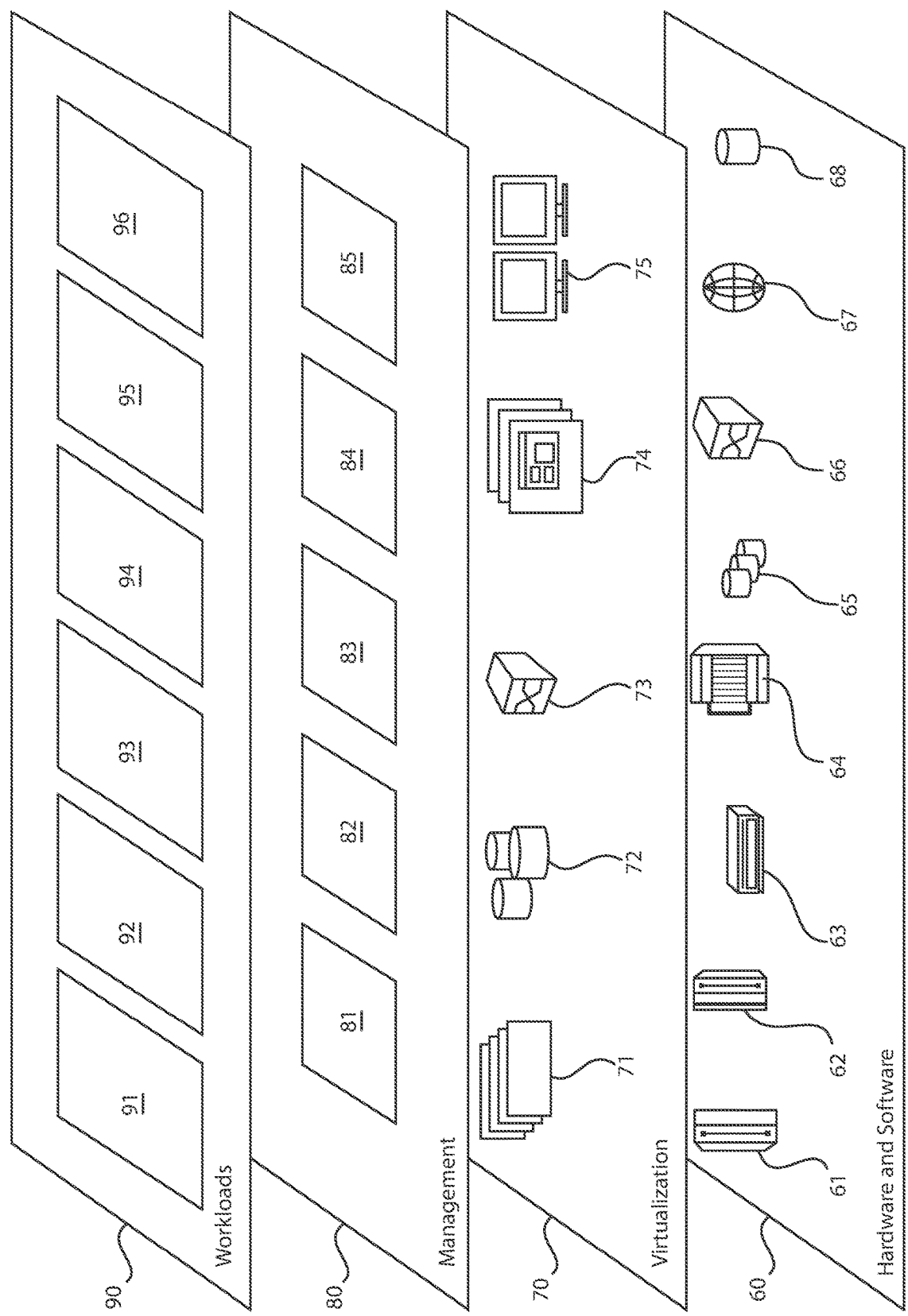
FIG. 11 depicts abstraction model layers according to an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and atom-based sensible synchronization for information indexing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method and computer program product for determining trends in patented technology, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system from updating a document to include revisions made by multiple parties comprising:
    an indexer for building relationships between atom repositories and source files, the atom repositories including information units;
    a mapping relationship builder for building relationships between multiple atom repositories produced by the indexer that are associated with a source file family;
    an atom controller for controlling atom adding and atom splitting in the multiple atom repositories in response to update, insert and delete operations of information units in the source file; and
    a synchronizer for synchronizing updates from one version of the source file to all versions of the source file in accordance with the atom controller that have been made by all users when be viewed by a single user.

2. The system of claim 1, wherein the synchronizing engine includes an interface for the user to enter updates to a document.

3. The system of claim 1, wherein the synchronizing engine automatically updates a document when changes being made to a document in the family of documents matches at least one development rule.

4. The system of claim 3, wherein the at least one development rule is a document updated related to at least one of text changes describing figures, changes in headers in columns and rows, text alterations for ASCII art, text changes to correct grammar, text changes to correct typographical errors, text changes to form breaks in run-on sentences, changes in text from passive tense to active tense, changes in text to fix links to internet web pages, updates of glossary for document, changes related to word usage databases, and combinations thereof.

5. The system of claim 4, wherein information units comprise words, sentences, paragraphs or a combination thereof.

6. The system of claim 1, wherein no version of the document is overwritten.

7. The system of claim 1, wherein the synchronizing engine displays the previous updates to the source file.

8. The system of claim 1, wherein mapping information is stored each version of the source file.

9. The system of claim 1, wherein mapping information is stored each version of the source file.

\* \* \* \* \*